(12) United States Patent
Hillis

(10) Patent No.: US 12,081,516 B2
(45) Date of Patent: Sep. 3, 2024

(54) PHYSICALLY SECURED NETWORK ACCESS CONTROL DEVICES AND SYSTEMS

(71) Applicant: Applied Invention, LLC, Burbank, CA (US)

(72) Inventor: W. Daniel Hillis, Rindge, NH (US)

(73) Assignee: APPLIED INVENTION, LLC, Burbank, CA (US)

( * ) Notice: Subject to any disclaimer, the term of this patent is extended or adjusted under 35 U.S.C. 154(b) by 700 days.

(21) Appl. No.: 17/233,831

(22) Filed: Apr. 19, 2021

(65) Prior Publication Data

US 2022/0337550 A1 Oct. 20, 2022

(51) Int. Cl.
*H04L 9/40* (2022.01)
*A62C 3/16* (2006.01)
*G07C 9/00* (2020.01)

(52) U.S. Cl.
CPC ............ *H04L 63/0209* (2013.01); *A62C 3/16* (2013.01); *G07C 9/00912* (2013.01); *H04L 63/10* (2013.01)

(58) Field of Classification Search
CPC .............................. G06F 21/68; H04L 63/0209
See application file for complete search history.

(56) References Cited

U.S. PATENT DOCUMENTS

| | | | |
|---|---|---|---|
| 8,805,925 B2 | 8/2014 | Price et al. | |
| 10,127,562 B2 | 11/2018 | Price et al. | |
| 10,477,719 B1* | 11/2019 | An | H05K 7/1487 |
| 2005/0177640 A1* | 8/2005 | Rubinstein | H04W 12/082 709/229 |
| 2005/0242948 A1* | 11/2005 | Tarr | G08B 25/10 340/539.22 |
| 2014/0230342 A1* | 8/2014 | Macioch | H05K 7/1497 52/27 |
| 2015/0188938 A1* | 7/2015 | Freeze-Skret | H04L 63/08 726/22 |
| 2016/0295722 A1* | 10/2016 | Franck | H02G 3/081 |
| 2017/0353446 A1* | 12/2017 | Wetterwald | H04L 67/12 |
| 2019/0215339 A1* | 7/2019 | Chen | H04L 63/02 |

* cited by examiner

*Primary Examiner* — Daniel B Potratz
(74) *Attorney, Agent, or Firm* — Perkins Coie LLP; Michael Glen; Vikram Iyengar

(57) ABSTRACT

A network security system includes a barrier surrounding an enclosure. The enclosure contains a first network and a first networked device connected to the first network. The barrier prevents the first network from breaching the enclosure and permits a second network to penetrate a first portion of the barrier. A container located within the enclosure mounts to the first portion of the barrier, such that a second portion of the container superposes the first portion of the barrier. The container permits the first network and the second network to enter the container. The container prevents the second network from breaching the container and entering a third portion of the enclosure located outside the container. A firewall device located within the container controls network traffic between the first networked device and a second networked device connected to the second network.

17 Claims, 5 Drawing Sheets

PHYSICALLY SECURED NETWORK ACCESS CONTROL DEVICES AND SYSTEMS

FIELD OF THE INVENTION

This description relates generally to networked devices and specifically to physically secured network access control devices and systems.

BACKGROUND

Most existing network protocols were not originally designed with the expectation that malicious actors would have access to the network. For example, on the Internet, the general philosophy is to allow all connected users and devices to communicate. As explained in the Internet Engineering Task Force's 1996 Architectural Principles of the Internet, "confidentiality and authentication are the responsibility of end users and must be implemented in the protocols used by the end users." Because of this lack of authentication, it is often impossible to know who originated a message received via the Internet.

For this and other reasons, even using state-of-the-art best practices, protecting the online resources of an organization is difficult. A single security weakness can cause catastrophic data losses, thefts, and shut down of critical functions. Denial of service attacks, insider attacks, and malware are especially difficult for organizations that support heterogonous software environments or multiple clouds and for organizations where users are a mix of employees, contractors, and vendors accessing the services from locations physically outside of company properties.

It can be difficult to configure firewalls in a way that enables legitimate communication outside an enclave without opening holes that can be exploited by attacks. And even if the firewall operates perfectly, the protected enclave remains vulnerable to attack from within—by an insider or by a rogue software entity such as a computer virus that penetrates the enclave, for example through an email attachment or USB drive. Most organizations accept that network security breaches are likely and use monitoring and auditing tools to catch them and stop them as quickly as possible when they inevitably occur.

These security practices and deficiencies are a consequence of design decisions in the Internet Protocol, which was defined so that anyone on the network could send a packet to anyone else with minimal coordination in managing the network. The network was not responsible for security. Except for specific devices like firewalls, the nodes in an IP network transmit packets without attention to who sent them and why. Moreover, access provided to technicians, administrators, or engineers that are tasked with installing or maintaining a metering, security, or firebarrier device can create an opening for a malicious entity to bypass the device to gain unrestricted or unmetered access to a secure resource.

SUMMARY

Apparatus and systems for physically secured network access control devices are disclosed. In some embodiments, a network security system includes a barrier surrounding an enclosure that contains a first computer network and first one or more networked devices configured to be connected to the first computer network. The first computer network is a private computer network. The barrier prevents the first computer network from breaching the enclosure. The barrier permits a second computer network to penetrate a first portion of the barrier. The second computer network is a public computer network. The network security system includes a container located within the enclosure. The container is configured to mount to the first portion of the barrier, such that a second portion of the container superposes the first portion of the barrier. The container permits the first computer network and the second computer network to enter the container. The container prevents the second computer network from breaching the container and entering a third portion of the enclosure located outside the container. The network security system includes a firewall device located within the container. The firewall device is configured to communicate with the first computer network and the second computer network. The firewall device controls network traffic between the first one or more networked devices and second one or more networked devices connected to the second computer network.

In some embodiments, a network security apparatus includes a barrier surrounding an enclosure containing a first computer network and first one or more networked devices configured to be connected to the first computer network. The barrier includes a first portion configured to permit a second computer network to penetrate the barrier at the first portion. A container includes a first shell located outside the enclosure and having a fastener configured to penetrate the barrier at the first portion. A second shell is located within the enclosure and has a catch configured to couple to the fastener at the first portion, such that the first shell is fastened to the second shell and the barrier. A firewall device is located within the second shell and configured to monitor network traffic on the first computer network and the second computer network. The second network is prevented from accessing the first one or more networked devices. A motion sensor is mounted on the container and configured to sense a container breach. Responsive to sensing the container breach, the firewall device is deactivated, access of the first network to the second network is disabled, a notification of the container breach is provided, or a state of the motion sensor is recorded in a log.

In some embodiments, a system includes a barrier surrounding an enclosure containing a first network. The barrier is configured to permit a second network to penetrate a first portion of the barrier. An access control device sealed by a container is located within the enclosure. The access control device is configured to mount to the first portion of the barrier, such that a second portion of the container superposes the first portion of the barrier. The access control device controls traffic between the first network and the second network.

These and other aspects, features, and implementations can be expressed as methods, apparatus, systems, components, program products, means or steps for performing a function, and in other ways.

These and other aspects, features, and implementations will become apparent from the following descriptions, including the claims.

DETAILED DESCRIPTION

In the following description, for the purposes of explanation, numerous specific details are set forth in order to provide a thorough understanding of the present embodiments. It will be apparent, however, that the present embodiments may be practiced without these specific details.

This document presents systems and apparatus for physically secured network access control devices. Metering, security, and firebarrier devices can be used for controlling and monitoring access to network resources. To protect the integrity of these access control devices, they are physically secured from access by unauthorized users. Technicians, administrators, or engineers who are tasked with installing and maintaining such access control devices are authorized to have access to the access control devices. The embodiments disclosed herein physically secure the access control devices in a manner to permit technicians to access the access control devices for maintenance or installation but prevent them from bypassing the access control devices. Therefore, the embodiments, prevent malicious entities from bypassing the access control devices or gain unrestricted or unmetered access to secure and private network resources.

The advantages and benefits of the physically secured network access control devices using the embodiments described herein include physically securing one or more access control devices in a manner that allows technicians authorized access to the access control device for maintenance and installation but prevents them from bypassing the access control device for unauthorized access. In addition, the embodiments disclosed herein provide more secure and reliable communication and an improved assurance that messages come from authenticated communicators. The embodiments enable a level of security and reliability that is impossible to achieve on the public Internet and difficult to achieve even in a privately managed network.

Moreover, the embodiments disclosed herein limit the damage that can be done by insider attacks, rogue devices, or computer viruses, and standardize a vetting procedure for connected users, hardware devices, and software entities. Furthermore, the embodiments make it easier for network architects to protect network communications from identity spoofing, eavesdropping, interception, packet flooding, domain-name-system vulnerabilities, sniffing, data modification, worms, man-in-the-middle attacks, denial-of-service attacks, and other types of application-level attacks.

Figure 1:
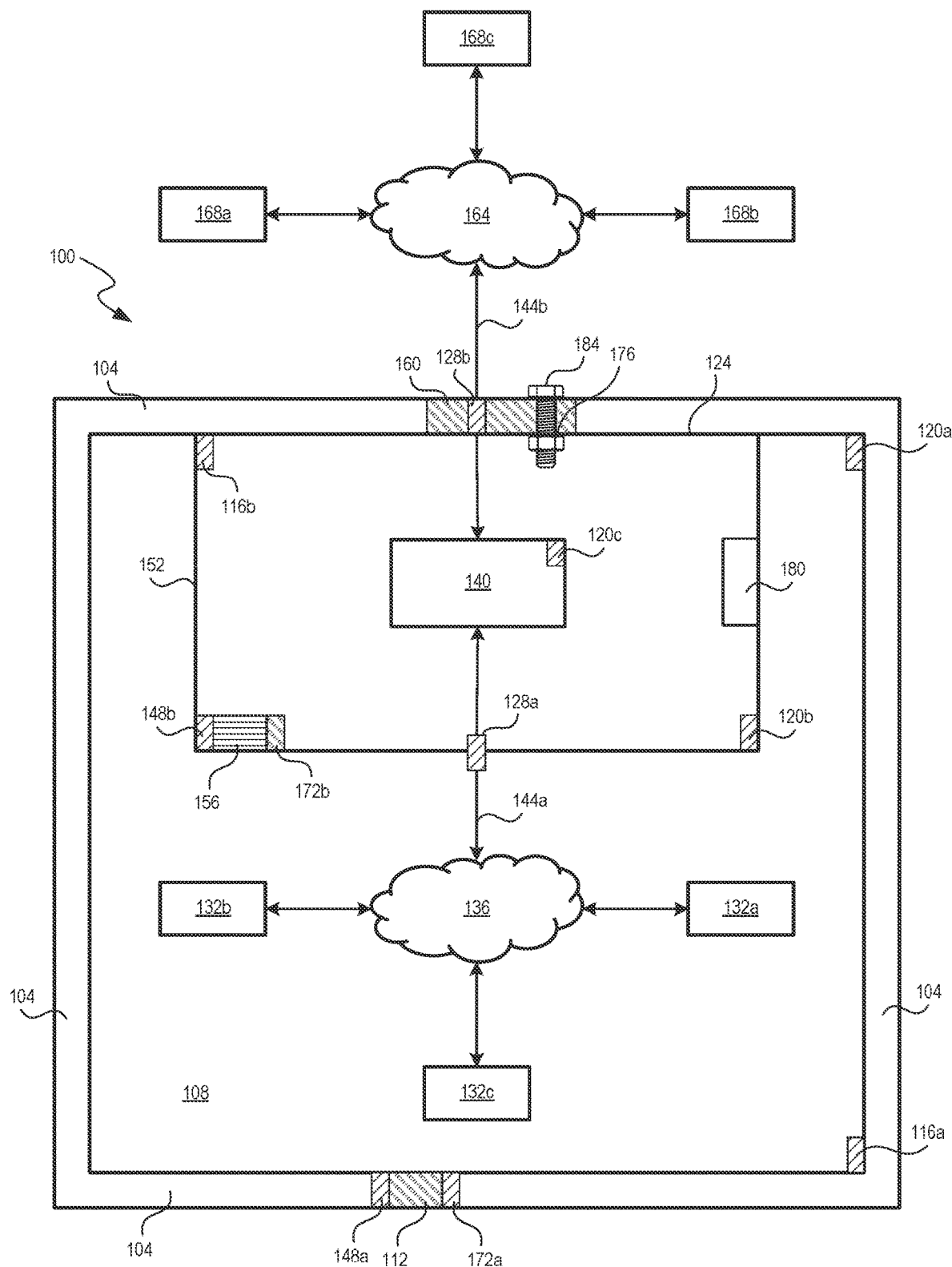
FIG. 1 is a block diagram illustrating a network security system including a physically secured network access control device, in accordance with one or more embodiments.

FIG. 1 is a block diagram illustrating a network security system 100 including a physically secured network access control device, in accordance with one or more embodiments. The network security system 100 can be implemented using components of the example computer system 500 illustrated and described in more detail with reference to FIG. 5. Likewise, other embodiments include different and/ or additional components, or are connected in a different manner.

The network security system 100 includes a barrier 104 surrounding an enclosure 108. The barrier 104 is made from at least one of concrete, metal (e.g., steel), stone, brick, masonry, or wood. The barrier 104 seals, at least partially, the enclosure 108. In some embodiments, the enclosure 108 is a room, a building, an office, etc., and the barrier 104 is at least one of a floor, a ceiling, or a wall of the room. In some embodiments, the barrier 104 includes an exterior wall that extends from the base of a building all the way to the roof. The 104 can be implemented to remain standing even if an adjacent structure collapses. The 104 can be thicker than normal walls with significant structural stability under fire conditions.

The enclosure 108 contains a first computer network 136 and first one or more networked devices 132a, 132b, 132c configured to be connected to the first computer network 136. For example, the first computer network 136 includes any combination of one or more local networks (e.g., an Ethernet network) coupled using wired or wireless links. Data exchanged over the first computer network 192 is transferred using any number of network layer protocols, such as Internet Protocol (IP), Multiprotocol Label Switching (MPLS), Asynchronous Transfer Mode (ATM), Frame Relay, etc. In some embodiments, the first computer network 136 is a private computer network, e.g., using a private IP address space. The first computer network 136 is implemented using components of the example computer system 500 illustrated and described in more detail with reference to FIG. 5.

The barrier 104 is configured to prevent the first computer network 136 from breaching the enclosure 108 by, at least partially, sealing and shielding the enclosure 108. The enclosure 108 completely envelopes or encloses the first one or more networked devices 132a, 132b, 132c and the first computer network 136. Physical access from outside the enclosure 108 to the first computer network 136 is thus prevented. The first one or more networked devices include at least one of a computer 132a, a server 132b, or a database 132c storing sensitive data, images, algorithms, software, applications, or processes. The first one or more networked devices 132a, 132b, 132c are each implemented using components of the example computer system 500 illustrated and described in more detail with reference to FIG. 5.

In some embodiments, the computer 132a, server 132b, and database 132c communicate with each other on the first computer network 136 using Ethernet, Token Ring, Fiber Distributed Data Interface (FDDI), or an Attached Resource Computer NETwork (ARCNET). Users and devices located outside the enclosure 108 are not permitted to directly communicate with the computer 132a, the server 132b, the database 132c, or the first computer network 136. In some embodiments, the first computer network 136 is a secure network. An example secure network 400 is illustrated and described in more detail with reference to FIG. 4. For example, the first computer network 136 can include an intrusion detection system (IDS) device or software application, a unified threat management (UTM) system, or a virtual private network (VPN) to improve security and be implemented with policies, processes, or practices to prevent, detect, and monitor unauthorized access, misuse, modification, or denial of the first computer network 136 and network-accessible resources.

The barrier 104 permits a second computer network 164 to enter a portion 160 of the barrier 104. For example, the barrier 104 surrounding the enclosure 108 has a portion 160 configured to permit the second computer network 164 to penetrate the barrier 104 at the portion 160. The second computer network 164 is a public computer network. For example, the second computer network 164 represents any combination of one or more public networks, wide area networks, or internetworks coupled using wired or wireless links deployed using terrestrial or satellite connections. Data exchanged over the second computer network 164, is transferred using any number of network layer protocols, such as IP, MPLS, ATM, Frame Relay, etc. Furthermore, in embodiments where the second computer network 164 represents a combination of multiple sub-networks, different network layer protocols are used at each of the underlying sub-networks. In an embodiment, the second computer network 164 represents one or more interconnected internetworks, such as the public Internet. The second computer network 164 is implemented using components of the example computer system 500 illustrated and described in more detail with reference to FIG. 5.

A secured container 152 is located within the enclosure 108. The container 152 is made from at least one of concrete, metal (e.g., steel, iron, etc.), stone, brick, masonry, or wood. The container 152 is configured to mount to the portion 160 of the barrier 104, such that a portion 124 of the container 152 superposes the portion 160 of the barrier 104. In some embodiments, the container 152 is inseparably mounted to the barrier 104, such that the container 152 cannot be removed or detached from the barrier 104.

The container 152 permits the first computer network 136 and the second computer network 164 to enter the container 152. For example, a network cable 144a of the first computer network 136 is routed through an aperture 128a or opening in a surface of the container 152. The network cable 144a can be an Ethernet cable, a Category 5 or 5e (CAT5 or CAT5e) cable, a coaxial cable, etc. In some embodiments, the network cable 144a of the first computer network 136 is routed to a port, jack, or socket in a surface of or within the container 152.

In some embodiments, a network cable 144b of the second computer network 164 is routed through an opening or aperture 128b in a surface of the portion 160 of the barrier 104. The network cable 144b can be an Ethernet cable, a Category 5 or 5e (CAT5 or CAT5e) cable, a coaxial cable, a telephone line, an Integrated Services Digital Network (ISDN) cable, a Digital Subscriber Line (DSL), a T1/E1 Dedicated Leased Line (DLL), etc. In some embodiments, the network cable 144b of the second computer network 164 is routed to a port, jack, or socket in a surface of or within the container 152.

The network security system 100 and the container 152 are each configured to prevent a user located within the enclosure 108 (but outside the container 152) from accessing the second computer network 164. Anyone present outside the container 152 but within the enclosure 108 therefore cannot communicate with or access the second computer network 164. The container 152 can be lined or sealed with a shielding material, e.g., including lead, metal braid, metal foil, or tape to prevent the first computer network 136 or the second computer network 164 from penetrating or breaching the container 152 once they have entered. The container 152 thus prevents the second computer network 164 from breaching the container 152 and entering a portion of the enclosure 108 that is located outside the container 152, e.g., where the first computer network 136 is located. The second computer network 164 is thus prevented from accessing the area of the enclosure 108 that is located outside the container 152. The second one or more networked devices 168a, 168b, 168c connected to the second computer network 164 are prevented from accessing data stored on the first one or more networked devices 132a, 132b, 132c connected to the first computer network 136. Each of the second one or more networked devices 168a, 168b, 168c can be a computer, a server, a mobile device, a smartphone, a tablet, an internet of things (IoT) device, a database, a cloud server, etc.

An access control device 140 is located within the container 152. The access control device 140 is configured to communicate with the first computer network 136 and the second computer network 164. The access control device 140 controls network traffic between the first one or more networked devices 132a, 132b, 132c and the second one or more networked devices 168a, 168b, 168c connected to the second computer network 164. The access control device 140 is implemented using components of the example computer system 500 illustrated and described in more detail with reference to FIG. 5. In some embodiments, the container 152 has a fastener 184 penetrating the barrier 104 at the portion 160 of the barrier 104. The container 152 has a catch coupled, screwed, or connected to the fastener 184 at the portion 160 of the barrier 104. The catch is the same as or similar to the catch 312 illustrated and described in more detail with reference to FIG. 3. The container 152 is thus fastened to the barrier 104 at the portion 160 of the barrier 104. The access control device 140 is located within the container 152 and is configured to prevent the second computer network 164 from accessing the 136.

The access control device 140 is a firewall device, a gateway device, a router, a metering device, a network monitoring device, etc. In some embodiments, the access control device 140 monitors and controls incoming and outgoing network traffic based on predetermined security rules, and establishes a barrier between the trusted network 136 and the untrusted network 164. In some embodiments, the access control device 140 is a piece of networking hardware used in telecommunications for telecommunications networks that allow data to flow from a discrete network (e.g., the first computer network 136) to another network (e.g., the second computer network 164). In some embodiments, the access control device 140 is distinct from a router or switch in that the access control device 140 communicates using more than one protocol to connect networks, and can operate at any of the seven layers of the open systems interconnection model (OSI).

In some embodiments, the access control device 140 is a networking device that forwards data packets between computer networks. A data packet is typically forwarded from one router to another router through the untrusted network 164. In some embodiments, the access control device 140 enables capturing, viewing, and analyzing network data and deciphering network protocols. It can be used to troubleshoot network problems and applications on the first computer network 136 or the second computer network 164. In other embodiments, the access control device 140 is sealed by the container 152 located within the enclosure 108. The access control device 140 is configured to control traffic between the first computer network 136 and the second computer network 164. The access control device is generally configured to prevent a user located within the enclosure 108 from directly accessing the second computer network 164.

In some embodiments, the network security system 100 includes a window 180 embedded in the container 152. The window 180 can be made of glass, transparent plastic, or another suitable material. The window 180 is configured to permit a user located within the enclosure 108 to observe a visual indicator within the container 152. In some embodiments, the visual indicator is generated by the access control device 140 or a motion sensor 120b mounted on the container 152. For example, the window 180 is configured to sense a breach of the container 152. In some embodiments, the visual indicator is generated by a motion sensor 120c mounted on the access control device 140. The motion sensor 120c mounted on the access control device 140 is configured to sense a breach of the access control device 140. For example, the visual indicator can be a message displayed on a digital screen, a mechanical flag in a particular position, a flashing light of a particular color, etc. The visual indicator can indicate a container breach, an access control device breach, an access control device malfunction, a fire, etc.

In some embodiments, the network security system 100 includes a security door 112 embedded in the barrier 104. The door 112 is made of at least one of a metal (e.g., iron, steel, aluminum, etc.), wood, fiberglass, or vinyl. The door 112 is configured to be secured by a lock 172a. The door 112 permits entry of authorized personnel into the enclosure 108 and prevents entry of unauthorized people. In some embodiments, the door 112 includes a sensor 148a to detect an intrusion or breach of the door 112 or enclosure 108 by a malicious entity. For example, the network security system 100 includes a door sensor 148a mounted on the door 112. The door sensor 148a is configured to sense at least one of motion of the door 112 or a breach of the lock 172a.

In some embodiments, the network security system 100 includes a security camera 116a mounted on the barrier 104. In some embodiments, the security camera 116a includes a Closed-Circuit Television (CCTV) camera that transmits video signals to a set of monitors, e.g., via the second computer network 164 or the first computer network 136 using point-to-point (P2P), point-to-multipoint (P2MP), or mesh wired, or wireless links. In some embodiments, the security camera 116a includes an IP camera that receives control data and sends image data via an IP network. The security camera 116a is configured to scan at least one of a location outside the enclosure 108 or a location within the enclosure 108 to detect an intrusion or breach of the enclosure 108 or the container 152 by a malicious entity.

In some embodiments, the network security system 100 includes a motion sensor 120a mounted on the barrier 104. The motion sensor 120 (a motion detector) is an electrical device that detects nearby motion and generates an alert of motion in an area, e.g., the enclosure 108. The motion sensor 120a is configured to sense at least one of motion outside the enclosure 108 or motion inside the enclosure 108. In some embodiments, the motion sensor 120a is an active electronic motion detector containing an optical, microwave, or acoustic sensor, and a transmitter. In some embodiments, the motion sensor 120a is a passive sensor that senses a signature from a moving object via emission or reflection. The motion sensor 120a detects an intrusion or breach of the enclosure 108 or the container 152 by a malicious entity.

In some embodiments, the network security system 100 includes a door 156 embedded in the container 152. The door 156 is made of at least one of a metal (e.g., iron, steel, aluminum, etc.), wood, fiberglass, or vinyl. The door 156 is configured to be secured by a lock 172b. The door 156 permits entry of authorized personnel into the container 152 and prevents entry of unauthorized people. The door 156 permits access of authorized personnel to the access control device 140. In some embodiments, the door 156 includes a sensor 148b to detect an intrusion or breach of the door 156 or the container 152 by a malicious entity. For example, the door 156 includes a door sensor 148b mounted on the door 156. The door sensor 148b is configured to sense at least one of motion of the door 156, a breach of the door 156, a breach of the container 152, or a breach of the lock 172b of the door 156.

In some embodiments, the network security system 100 includes a security camera 116b mounted on the container 152. In some embodiments, the security camera 116b includes a Closed-Circuit Television (CCTV) camera that transmits video signals to a set of monitors, e.g., via the second computer network 164 or the first computer network 136 using point-to-point (P2P), point-to-multipoint (P2MP), or mesh wired, or wireless links. In some embodiments, the security camera 116b includes an IP camera that receives control data and sends image data via an IP network. The security camera 116b is configured to scan at least one of a location outside the container 152 or a location within the container 152 to detect an intrusion or breach of the enclosure 108, the container 152, or the access control device 140 by a malicious entity. In some embodiments, the security camera 116b is trained on the access control device 140 to detect tampering with the access control device 140.

In some embodiments, the network security system 100 includes a motion sensor 120b mounted on the container 152. The motion sensor 120b (a motion detector) is an electrical device that detects nearby motion and generates an alert of motion in an area, e.g., the enclosure 108 or the container 152. The motion sensor 180 is configured to sense at least one of motion outside the container 152 or motion inside the container 152. In some embodiments, the motion sensor 120b is an active electronic motion detector containing an optical, microwave, or acoustic sensor, and a transmitter. In some embodiments, the motion sensor 120b is a passive sensor that senses a signature from a moving object via emission or reflection. The motion sensor 120b detects an intrusion or breach of the enclosure 108, the access control device 140, or the container 152 by a malicious entity.

In some embodiments, the motion sensors 120a, 120b, 120c are configured to sense a breach of the container 152, for example, a malicious entity breaking into, entering, or ramming the container 152. Responsive to sensing the breach, the motion sensors 120a, 120b, 120c can deactivate the access control device 140, such that it blocks traffic and becomes a "brick." The motion sensors 120a, 120b, 120c can also disable access of the first computer network 136 to the second computer network 164 to protect sensitive data stored on the first computer network 136, or the first one or more networked devices 132a, 132b, 132c. The motion sensors 120a, 120b, 120c can provide or transmit a notification of a breach via the first computer network 136 or the second computer network 164, e.g., to a remote computer, e.g., the device 168a. The motion sensors 120a, 120b, 120c can also record a state of the motion sensors in a log to be read later. As described, the motion sensor 120c can deactivate the access control device 140 responsive to detecting a breach of the access control device 140. The motion sensor 120c is configured to sense that the access control device 140 has been removed from the container 152. Responsive to sensing that the access control device 140 has been removed from the container 152, the motion sensor 120c perform actions including at least one of disabling access of the first computer network 136 to the second computer network 164 or providing a notification that the access control device 140 has been removed from the container 152. In some embodiments, the notification includes at least one of an audible alarm, a flashing light, or a message transmitted over at least one of the first computer network 136 or the second computer network 164.

In some embodiments, the network security system 100 includes a tamper-resistant fastener 184 located partly within the container 152. For example, the tamper-resistant fastener 184 can be attached to, mounted on, or embedded in a surface of the container 152. The portion 160 of the barrier 104 has an opening or slot 176 configured to permit the fastener 184 to penetrate the barrier 104 at the portion 160. The tamper-resistant fastener 184 can be a bolt and nut combination, one or more screws, pins, rivets, snap fasteners, etc. The tamper-resistant fastener 184 mechanically joins or affixes the container 152 to the barrier 104. In some embodiments, the container 152 is welded, crimped, soldered, brazed, or cemented to the barrier 104. In some embodiments, the tamper-resistant fastener 184 is made of at least one of a metal (e.g., stainless steel, carbon steel, or alloy steel), vinyl, or a plastic. The tamper-resistant fastener 184 is configured to mount the container 152 to the portion 160 of the barrier 104. In some embodiments, the tamper-resistant fastener 184 is configured to be unfastened from only within the container 152. Therefore, a technician that wishes to unfasten the tamper-resistant fastener 184 must do so from only within the container 152. For example, the tamper-resistant fastener 184 can include bolts that intrude into the container 152 from outside the barrier 104 and nuts that are positioned within the container 152 to fasten onto the bolts. An example catch 312 located within the container 152 to couple with the 184 is illustrated and described in more detail with reference to FIG. 3.

The container 152 permits the first computer network 136 and the second computer network 164 to enter the container 152. In some embodiments, the container 152 has an aperture 128a or opening located on a surface of the container 152. The aperture 128a or opening is configured to permit the first computer network 136 to enter the container 152. For example, a network cable 144a of the first computer network 136 is routed through the opening 128a or aperture in the surface of the container 152. The network cable 144a can be an Ethernet cable, a Category 5 or 5e (CAT5 or CAT5e) cable, a coaxial cable, etc. In some embodiments, the network cable 144a of the first computer network 136 is routed to a port, jack, or socket in the surface of or within the container 152.

In some embodiments, the first computer network 136 and the second computer network 164 each include cables 144a, 144b fastened to the container 152 using tamper-resistant fasteners located within the container 152. These tamper-resistant fasteners are configured to be unfastened from only within the container 152. For example, the cables 144a, 144b are secured to the container 152 to protect the wiring connections inside the container 152 and prevent the cables 144a, 144b from rubbing against the container 152 and damaging the sheathing. In some embodiments, the tamper-resistant fasteners include saddle-shaped clamps mounted inside the container 152. The cables 144a, 144b are inserted into the container 152 and slid under the clamp whose screw is tightened to secure the cables 144a, 144b. In other embodiments, a locknut-type clamp (a metal cable clamp having a short, threaded cylinder with locknut on one end and a saddle-type clamp with two screws on the other end) is used. To install this type of clamp, a threaded end is inserted into the container 152, and then threaded on the locknut from inside the box. The cables 144a, 144b are inserted through the clamp saddle and into the container 152. The screws are tightened on the saddle to secure the cables 144a, 144b.

Figure 2:
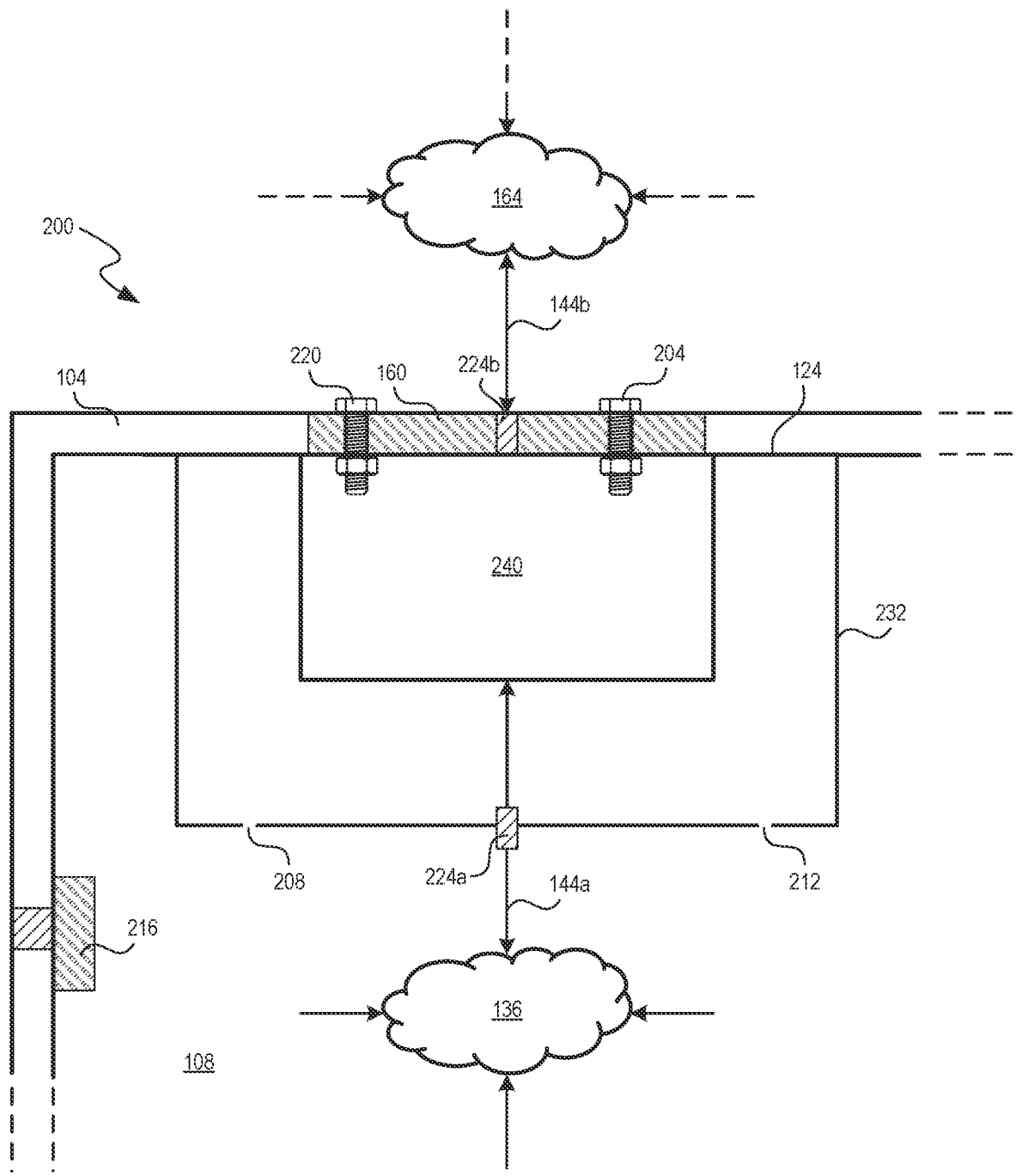
FIG. 2 is a block diagram illustrating a network security apparatus including a physically secured network access control device, in accordance with one or more embodiments.

FIG. 2 is a block diagram illustrating a network security apparatus 200 including a physically secured network access control device 240, in accordance with one or more embodiments. The network security apparatus 200 can be implemented using components of the example computer system 500 illustrated and described in more detail with reference to FIG. 5. Likewise, other embodiments include different and/or additional components, or are connected in a different manner.

The network security apparatus 200 includes a barrier 104 surrounding an enclosure 108. The barrier 104 and enclosure 108 are illustrated and described in more detail with reference to FIG. 1. The barrier 104 seals, at least partially, the enclosure 108. The enclosure contains a first computer network 136. The first computer network 136 is illustrated and described in more detail with reference to FIG. 1. The barrier 104 is configured to prevent the first computer network 136 from breaching the enclosure 108. Thus, a person or device located outside the enclosure 108 cannot directly access or communicate with the first computer network 136. The barrier is configured to permit a second computer network 164 to penetrate a portion 160 of the barrier 104. The second computer network 164 can be a public computer network. The second computer network 164 and portion 160 are illustrated and described in more detail with reference to FIG. 1.

A container 232 is located within the enclosure 108. The container 232 is similar to the container 152 illustrated and described in more detail with reference to FIG. 1. The container 232 is configured to mount to the portion 160 of the barrier 104, such that a portion 124 of the container 232 superposes the portion 160 of the barrier 104. The portion 124 is illustrated and described in more detail with reference to FIG. 1. The container 232 permits the first computer network 136 and the second computer network 164 to enter the container 232. The container 232 is configured to prevent the second computer network 164 from breaching the container 232 and entering a portion of the enclosure 108 that is located outside the container 232. A person or device located within the enclosure 108 but outside the container 232 is prevented from directly communicating with the second computer network 164.

An access control device 240 is located within the container 232. In some embodiments, the access control device 240 is configured to be sealed by the container 232 (except for the conduits 208, 212 and the apertures 224a, 224b) to prevent access to the access control device 240. The access control device 240 is configured to mount to the portion 160 of the barrier 104, such that a portion 124 of the container 232 superposes the portion 160 of the barrier 104. The portion 124 of the container 232 is illustrated and described in more detail with reference to FIG. 1. The access control device 240 controls traffic between the first computer network 136 and the second computer network 164. The access control device 240 is the same as or similar to the access control device 140 illustrated and described in more detail with reference to FIG. 1. The access control device 240 includes at least one of a firewall device, a gateway device, a router, a metering device, or a network monitoring device. The access control device 240 is configured to communicate with the first computer network 136 and the second computer network 164. The access control device 240 is further configured to control network traffic between first one or more networked devices on the first computer network 136 and second one or more networked devices connected to the second computer network 164. The first one or more networked devices are the same as or similar to the first one or more networked devices 132a, 132b, 132c illustrated and described in more detail with reference to FIG. 1. The second one or more networked devices are the same as or similar to the second one or more networked devices 168a, 168b, 168c illustrated and described in more detail with reference to FIG. 1. The access control device 240 is configured to prevent a user located within the enclosure 108 from accessing the second computer network 164.

In some embodiments, the network security apparatus 200 includes a door embedded in the barrier. The door is the same as or similar to the door 112 illustrated and described in more detail with reference to FIG. 1. The door is configured to be secured by a lock and permit entry into the enclosure 108. The lock is the same as or similar to the lock 172a illustrated and described in more detail with reference to FIG. 1. A security camera mounted on the barrier 104 is configured to scan at least one of a location outside the enclosure 108 or a location within the enclosure 108. The security camera is the same as or similar to the security camera 116a illustrated and described in more detail with reference to FIG. 1. A motion sensor can be mounted on the barrier 104 and configured to sense at least one of motion outside the enclosure 108 or motion inside the enclosure 108. The motion sensor is the same as or similar to the motion sensor 120a illustrated and described in more detail with reference to FIG. 1. A door sensor can also be mounted on the door and configured to sense at least one of motion of the door or a breach of the lock. The door sensor is the same as or similar to the door sensor 148a illustrated and described in more detail with reference to FIG. 1.

In some embodiments, the network security apparatus 200 includes a security camera mounted on the container 232. The security camera is the same as or similar to the security camera 116b illustrated and described in more detail with reference to FIG. 1. The security camera 116b can be configured to scan at least one of a location outside the container 232 or the access control device 240. A motion sensor can be mounted on the container 232 and configured to sense at least one of motion outside the container 232 or a breach of the container 232. The motion sensor is the same as or similar to the motion sensor 120b illustrated and described in more detail with reference to FIG. 1. A motion sensor can be mounted on the access control device 240 and configured to sense a breach of the container 232 or a breach of the access control device 240. The motion sensor is the same as or similar to the motion sensor 120c illustrated and described in more detail with reference to FIG. 1. The motion sensor is configured to sense that the access control device 240 has been removed from the portion 160 of the barrier 104. Responsive to sensing that the access control device 240 has been removed from the portion 160 of the barrier 104, the motion sensor can disable access of the first computer network 136 to the second computer network 164, provide a notification that the access control device 240 has been removed from the portion 160 of the barrier 104, or record a state of the motion sensor in a log. Responsive to sensing a breach, each of the motion sensors can deactivate the access control device 240, disable access of the first computer network 132 to the second computer network 164, provide a notification of the breach, or record a state of one or more of the motion sensors in a log. The notification includes at least one of an audible alarm, a flashing light, or a message transmitted over at least one of the first computer network 136 or the second computer network 164.

In some embodiments, the network security system 200 includes tamper-resistant fasteners 204, 220, at least partly located within the container 232. The tamper-resistant fasteners 204, 220 are configured to mount the container 232 and the access control device 240 to the portion 160 of the barrier 104. The tamper-resistant fasteners 204, 220 can be unfastened from only within the container 232 for increased security. For example, the tamper-resistant fasteners 204, 220 can include bolts penetrating the barrier 104 at the portion 160 and catches (e.g., nuts) screwed onto the bolts, such that the 232 and 240 are fastened to each other and to the barrier 104. Thus a malicious entity is prevented from unfastening the tamper-resistant fasteners 204, 220 from outside the enclosure 108. The tamper-resistant fasteners 204, 220 are configured to mount the access control device 240 to the portion 160 of the barrier 104 to prevent removal of the access control device 240 and the container 232 from the portion 160 of the barrier 104. The tamper-resistant fasteners 204, 220 can include smart devices configured to deactivate the access control device 240 responsive to detecting a breach of the access control device 240.

In some embodiments, the portion 160 of the barrier 104 has an aperture 224b or opening configured to permit the second computer network 164 to penetrate the barrier 104 at the portion 160. The aperture 224b is the same as or similar to the aperture 128b illustrated and described in more detail with reference to FIG. 1. An aperture 224a or opening located on a surface of the container 232 permits the first computer network 136 to enter the container 232. In some embodiments, the first computer network 136 and the second computer network 164 each include cables 114a, 114b, respectively, fastened to the container 232 using tamper-resistant fasteners located within the container 232, as described in more detail with reference to FIG. 1. The tamper-resistant fasteners are configured to be unfastened from only within the container 232 to provide increased security.

In some embodiments, the network security apparatus 200 includes a first conduit 208 located on a surface of the container 232. The conduit 208 is configured to permit power cables to enter the container 232 via the conduit 208. The conduit 208 can include a rigid metallic conduit, an electrical metallic tubing (EMT), an intermediate metallic conduit (IMC) having a galvanized surface, a galvanized rigid conduit (GRC), a flexible metallic conduit, or an electrical outlet. In some embodiments, the network security apparatus 200 includes a second conduit 212 located on the surface of the container 232 and configured to permit heat to escape the container 232 via the conduit 212. For example, the conduit 212 can include a vent or duct of galvanized steel, fiberglass duct board/insulation panels, or flexible ducting. The network security apparatus 200 includes a heat removal device 216, such as a cooling tower, an exhaust fan, a heat exchanger, a heat sink, a Peltier device, or a heat tube located within the enclosure 108 and configured to expel the heat from the enclosure 108. For example, the heat removal device 216 can transfer heat from the enclosure 108 to the environment outside the barrier 104 or dissipate heat away from the barrier 104 and the enclosure 108. The heat removal device 216 can include a thermoelectric pump or a solid-state active pump that transfers heat from the enclosure 108 to outside the enclosure 108.

Figure 3:
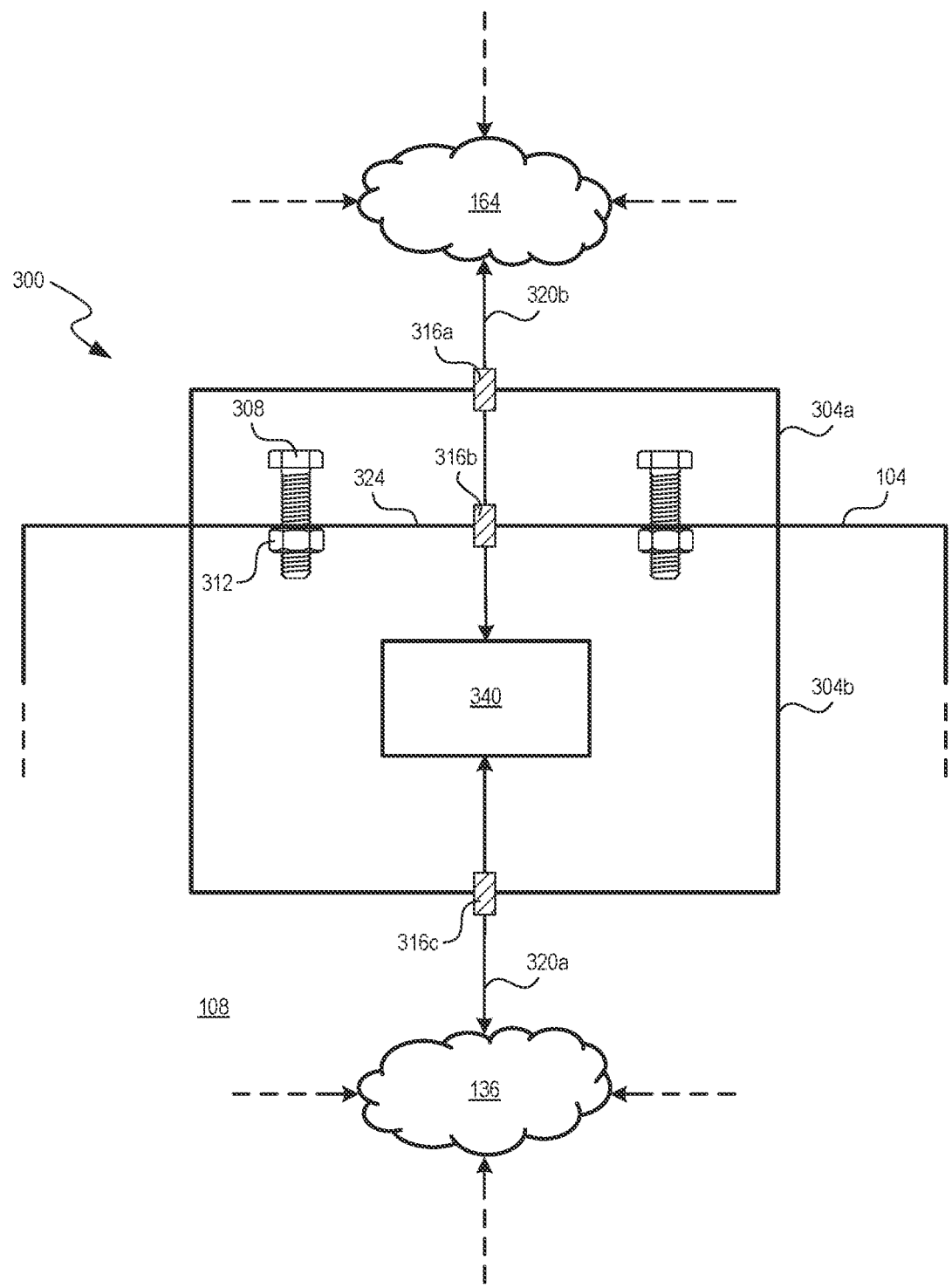
FIG. 3 is a block diagram illustrating a system including a physically secured network access control device, in accordance with one or more embodiments.

FIG. 3 is a block diagram illustrating a system 300 including a physically secured network access control device 340, in accordance with one or more embodiments. The system 300 can be implemented using components of the example computer system 500 illustrated and described in more detail with reference to FIG. 5. Likewise, other embodiments include different and/or additional components, or are connected in a different manner.

The system 300 includes a barrier 104 surrounding an enclosure 108 containing a first computer network 136 and first one or more networked devices configured to be connected to the first computer network 136. The barrier 104, enclosure 108, and first computer network 136 are illustrated and described in more detail with reference to FIGS. 1, 2. The first one or more networked devices are the same as or similar to the first one or more networked devices 132a, 132b, 132c illustrated and described in more detail with reference to FIG. 1. The barrier includes a portion 324 configured to permit a second computer network 164 to penetrate the barrier 104 at the portion 324. The portion 324 is the same as or similar to the portion 160 illustrated and described in more detail with reference to FIG. 1. The second computer network 164 is illustrated and described in more detail with reference to FIG. 1.

The system 300 includes a container having a first shell 304a located outside the enclosure 108. The first shell 304a is made from at least one of concrete, metal (e.g., steel, iron, etc.), stone, brick, masonry, or wood. The first shell 304a has a fastener 308 configured to penetrate the barrier 104 at the portion 324. The fastener 308 is the same as or similar to the tamper-resistant fastener 184 illustrated and described in more detail with reference to FIG. 1. A second shell 304b is located within the enclosure 108. The second shell 304b is made from at least one of concrete, metal (e.g., steel, iron, etc.), stone, brick, masonry, or wood. In some embodiments, the second shell 304b is a fire barrier device. The second shell 304b can be an interior wall designed to sub-divide portions of the enclosure 108, and can be supported by structures, such as roofs, columns or floors. The second shell 304b can restrict a flow of heat within the area of origin.

The second shell 304b has a catch 312 configured to couple to the fastener 308 at the first portion 324. The first shell 304a is configured to be fastened to the second shell 304b and the barrier 104 using the catch 312. The catch 312 can include a nut, a latch, a clasp, a hasp, a bar, or a sneck. The second shell 304b is configured to prevent a user located within the enclosure 108 but outside the second shell 304b from accessing the second computer network 164. In some embodiments, the catch 312 is configured to be uncoupled from the fastener 308 from only within the second shell 304b. The first shell 304a is unfastened from the second shell 304b and the barrier 104 from only within the second shell 304b for increased security. The first shell 304a has an opening or aperture 316a located on a surface of the first shell 316a. The aperture 316a is the same as or similar to the aperture 128b illustrated and described in more detail with reference to FIG. 1. The aperture 316a is configured to permit the first computer network 164 to enter the first shell 304a.

The portion 324 has an opening or aperture 316b located on a surface of the barrier 104. The aperture 316b is the same as or similar to the aperture 128b illustrated and described in more detail with reference to FIG. 1. The aperture 316b is configured to permit the first computer network 164 to enter the second shell 304b. The second shell 304b has an opening or aperture 316c located on a surface of the second shell 316b. The aperture 316c is the same as or similar to the aperture 128a illustrated and described in more detail with reference to FIG. 1. The aperture 316c is configured to permit the first computer network 136 to enter the second shell 304b. In some embodiments, the first computer network 136 and the second computer network 164 each include cables 320a and 320b, respectively, fastened to the container using tamper-resistant fasteners located within the container. The cables 320a, 320b are configured to be unfastened from only within the second shell 304b.

An access control device 340 is located within the second shell 304b. The access control device 340 is the same as or similar to the access control devices 140, 240 illustrated and described in more detail with reference to FIGS. 1, 2. The access control device 340 is configured to monitor network traffic on the first computer network 136 and the second computer network 164. The second computer network 164 is prevented from accessing the first one or more networked devices. In some embodiments, a motion sensor is mounted on the container (e.g., on at least one of the shells 304a, 304b) and configured to sense a container breach. The motion sensor is the same as or similar to the motion sensor 120b illustrated and described in more detail with reference to FIG. 1. Responsive to sensing a breach, the access control device 340 can be deactivated, access of the first computer network 136 to the second computer network 164 can be disabled, a notification of the breach can be provided, or a state of the motion sensor can be recorded in a log by the motion sensor.

In some embodiments, the system 300 includes a door embedded in the second shell 304b and configured to be secured by a lock. The door is the same as or similar to the door 156 illustrated and described in more detail with reference to FIG. 1. The lock is the same as or similar to the lock 172b illustrated and described in more detail with reference to FIG. 1. The door is configured to permit access to the access control device 340. A door sensor can be mounted on the door and configured to sense at least one of motion of the door or a lock breach. The door sensor is the same as or similar to the door sensor 148b illustrated and described in more detail with reference to FIG. 1. A security camera can be mounted on the second shell 304b and configured to scan at least one of a location outside the second shell 304b or the access control device 340. The security camera is the same as or similar to the security camera 116b illustrated and described in more detail with reference to FIG. 1.

In some embodiments, the system 300 includes a window embedded in the second shell 304b. The window is the same as or similar to the window 180 illustrated and described in more detail with reference to FIG. 1. The window is configured to permit a user located within the enclosure 108 to observe a visual indicator within the second shell 304b. The visual indicator is generated by at least one of the access control device 340, a motion sensor configured to sense a breach of the second shell 304b, or a motion sensor mounted on the access control device 340 and configured to sense an access control device breach.

Figure 4:
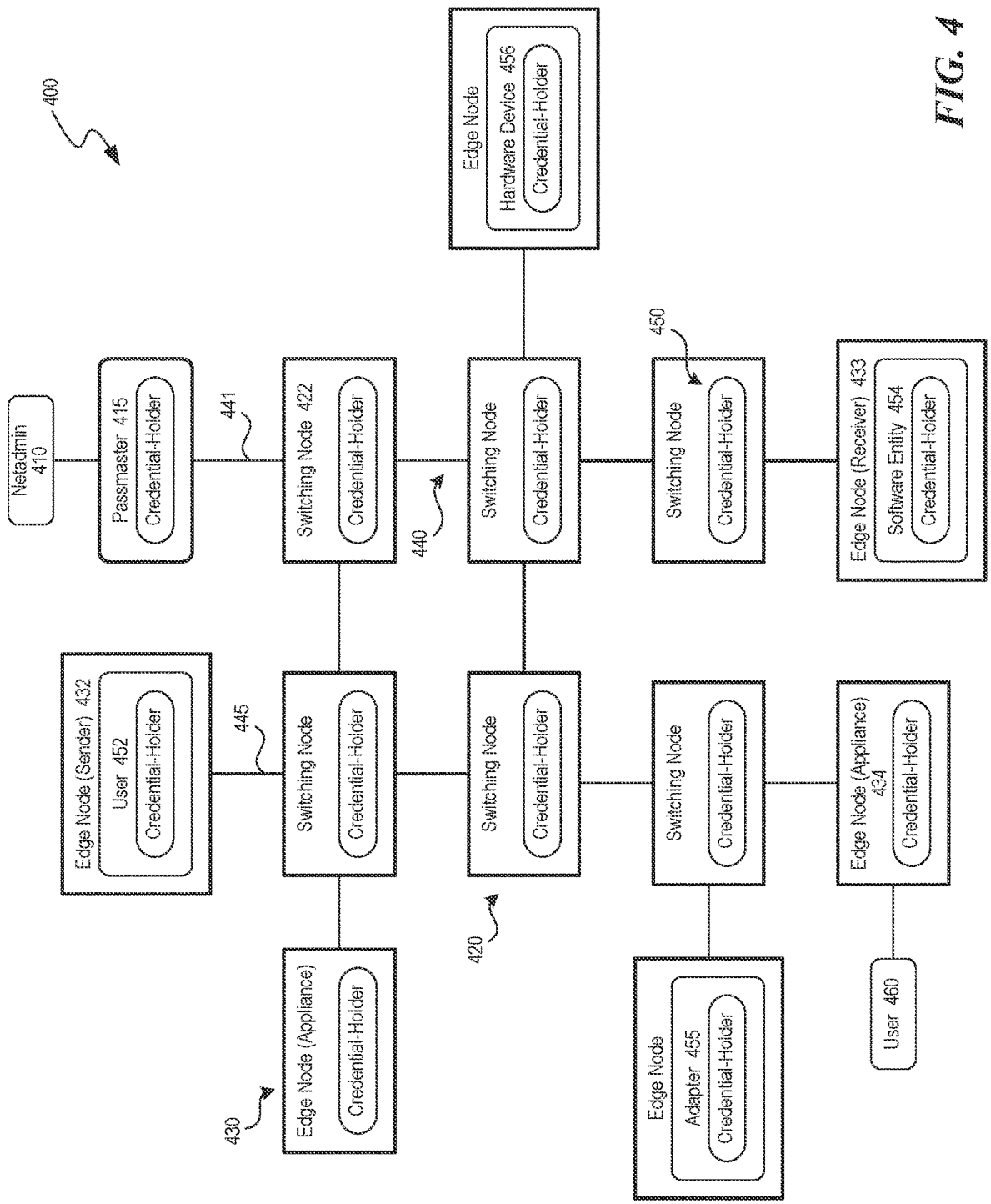
FIG. 4 is a block diagram illustrating a secure network, in accordance with one or more embodiments.

FIG. 4 is a block diagram illustrating an example secure network 400, in accordance with one or more embodiments. The secure network 400 can be implemented using components of the example computer system 500 illustrated and described in more detail with reference to FIG. 5. Likewise, other embodiments include different and/or additional components, or are connected in a different manner.

The secure network 400 is under the control of a netadmin 410 that specifies policies that are enforced by a passbuilder 415. The netadmin 410 and the passbuilder 415 are each implemented using components of the example computer system 500 illustrated and described in more detail with reference to FIG. 5. The netadmin 410 specifies a set of security policies, and these policies are automatically enforced by a distributed software service on the secure network 400 called the passbuilder 415. The passbuilder 415 is responsible for implementing the polices, issuing passes to credential-holders 450, and configuring the secure network 400 to enforce the polices while supporting the permissions and guarantees of the passes.

The credential-holders 450 can be implemented using components of the example computer system 500 illustrated and described in more detail with reference to FIG. 5. Credential-holders 450 are accredited hardware devices, software entities, or combinations thereof, for example a particular cell phone with approved software. For example, the credential-holders 450 at edge nodes in the network 400 include a user device 452, a software entity 454 (in one instance, an adapter 455), and a hardware device 456. The hardware device 456 can be implemented using components of the example computer system 500 illustrated and described in more detail with reference to FIG. 5. The passbuilder 415 designates new network configurations and retires old network configurations in a controlled and tested manner that ensures reliability and does not interrupt the transmission of packets with valid permissions.

Shown within the secure network 400 of FIG. 4 are multiple nodes, both switching nodes 420 and edge nodes 430, connected by links 440. The switching nodes 420, edge nodes 430, and links 440 can each be implemented using components of the example computer system 500 illustrated and described in more detail with reference to FIG. 5. Switching nodes 420 forward packets that originate from authenticated credential-holders 450, specify an active configuration, and comply with the permissions of the specified passes. Edge nodes 430 act as sources of and destinations for packets. Edge nodes 430 can be clients, servers, or other network-connected devices. Links 440 form point-to-point connections between nodes of the secure network 400, including switching nodes 420 and edge nodes 430. In practice, the links 440 may be hardwired or wireless connections, or a communication pathways through another network, such as the Internet. An edge node shown in FIG. 2 is an appliance 434 that is itself a credential-holder, supporting network interaction with a connected user device 460.

A switching node 422 assists in implementing the passbuilder 415 by allowing the passbuilder connection 441 to the secure network 400. That is, this switching node 422 allows the passbuilder 415 to be communicatively linked with other nodes of the secure network 400 to perform its configuration of the secure network 400. The switching node 422 providing the connection need not be exclusively dedicated to this role—it may also serve, for example, as a router or switch. Alternatively, the passbuilder 415 may reside within one or more nodes. FIG. 2 also shows a communication route 445 including several links between a credential-holder at an edge node 432 (a sender) and a credential-holder at another edge node 433 (a receiver).

Figure 5:
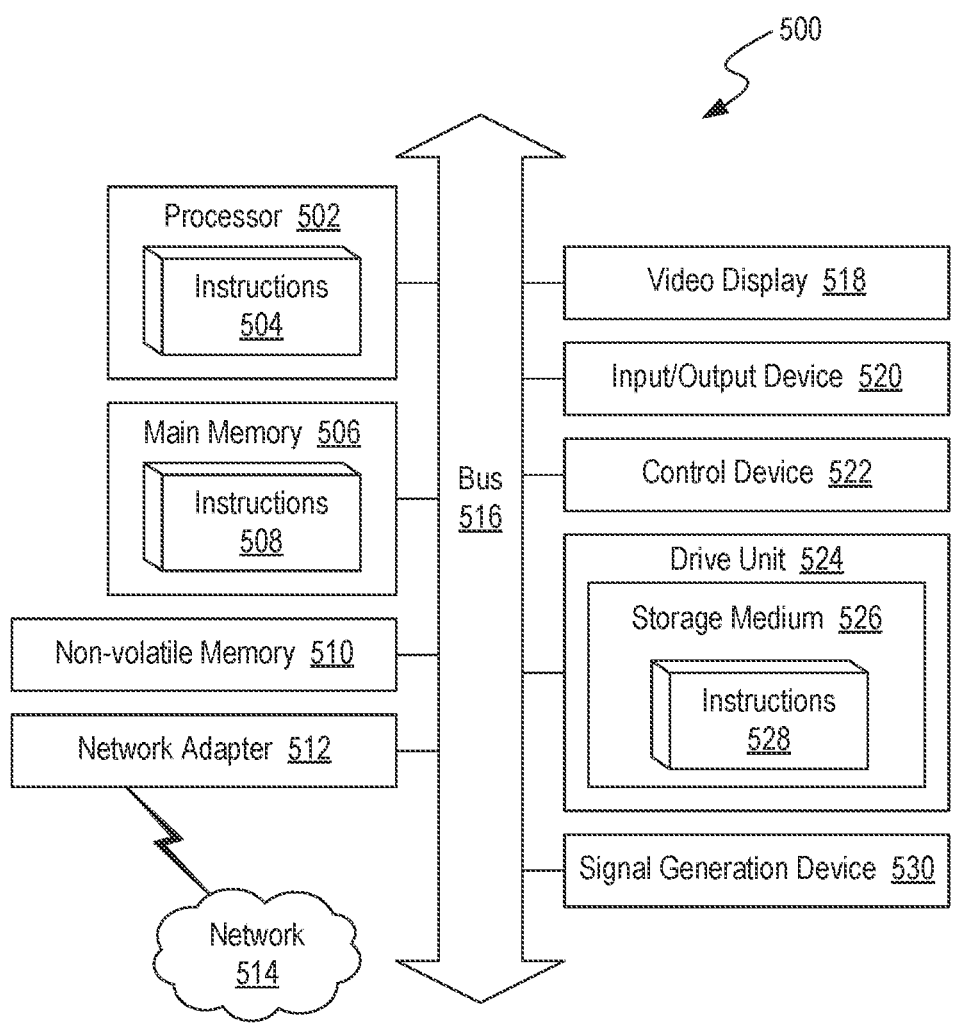
FIG. 5 is a block diagram illustrating an example computer system, in accordance with one or more embodiments.

FIG. 5 is a block diagram illustrating an example computer system 500, in accordance with one or more embodiments. Components of the example computer system 500 can be used to implement the first computer network 136, first one or more networked devices 132a, 132b, 132c, second computer network 164, second one or more networked devices 168a, 168b, 168c, sensors and security cameras, and the secure network 400 illustrated and described in more detail with reference to FIGS. 1, 2, 3, and 4. At least some operations described herein can be implemented on the computer system 500.

The computer system 500 can include one or more central processing units ("processors") 502, main memory 506, non-volatile memory 510, network adapter 512 (e.g., network interface), video display 518, input/output devices 520, control device 522 (e.g., keyboard and pointing devices), drive unit 524 including a storage medium 526, and a signal generation device 530 that are communicatively connected to a bus 516. The bus 516 is illustrated as an abstraction that represents one or more physical buses and/or point-to-point connections that are connected by appropriate bridges, adapters, or controllers. The bus 516, therefore, can include a system bus, a Peripheral Component Interconnect (PCI) bus or PCI-Express bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 1394 bus (also referred to as "Firewire").

The computer system 500 can share a similar computer processor architecture as that of a desktop computer, tablet computer, personal digital assistant (PDA), mobile phone, game console, music player, wearable electronic device (e.g., a watch or fitness tracker), network-connected ("smart") device (e.g., a television or home assistant device), virtual/augmented reality systems (e.g., a head-mounted display), or another electronic device capable of executing a set of instructions (sequential or otherwise) that specify action(s) to be taken by the computer system 500.

While the main memory 506, non-volatile memory 510, and storage medium 526 (also called a "machine-readable medium") are shown to be a single medium, the term "machine-readable medium" and "storage medium" should be taken to include a single medium or multiple media (e.g., a centralized/distributed database and/or associated caches and servers) that store one or more sets of instructions 528. The term "machine-readable medium" and "storage medium" shall also be taken to include any medium that is capable of storing, encoding, or carrying a set of instructions for execution by the computer system 500.

In general, the routines executed to implement the embodiments of the disclosure may be implemented as part of an operating system or a specific application, component, program, object, module, or sequence of instructions (collectively referred to as "computer programs"). The computer programs typically include one or more instructions (e.g., instructions 504, 508, 528) set at various times in various memory and storage devices in a computing device. When read and executed by the one or more processors 502, the instruction(s) cause the computer system 500 to perform operations to execute elements involving the various aspects of the disclosure.

Moreover, while embodiments have been described in the context of fully functioning computing devices, those skilled in the art will appreciate that the various embodiments are capable of being distributed as a program product in a variety of forms. The disclosure applies regardless of the particular type of machine or computer-readable media used to actually effect the distribution.

Further examples of machine-readable storage media, machine-readable media, or computer-readable media include recordable-type media such as volatile and non-volatile memory devices 510, floppy and other removable disks, hard disk drives, optical disks (e.g., Compact Disk Read-Only Memory (CD-ROMS), Digital Versatile Disks (DVDs)), and transmission-type media such as digital and analog communication links.

The network adapter 512 enables the computer system 500 to mediate data in a network 514 with an entity that is external to the computer system 500 through any communication protocol supported by the computer system 500 and the external entity. The network adapter 512 can include a network adaptor card, a wireless network interface card, a router, an access point, a wireless router, a switch, a multilayer switch, a protocol converter, a gateway, a bridge, bridge router, a hub, a digital media receiver, and/or a repeater.

The network adapter 512 may include a firewall that governs and/or manages permission to access/proxy data in a computer network and tracks varying levels of trust between different machines and/or applications. The firewall can be any number of modules having any combination of hardware and/or software components able to enforce a predetermined set of access rights between a particular set of machines and applications, machines and machines, and/or applications and applications (e.g., to regulate the flow of traffic and resource sharing between these entities). The firewall may additionally manage and/or have access to an access control list that details permissions including the access and operation rights of an object by an individual, a machine, and/or an application, and the circumstances under which the permission rights stand.

In alternative embodiments, a network security apparatus includes a barrier surrounding an enclosure containing a first computer network and first one or more networked devices configured to be connected to the first computer network. The barrier includes a first portion configured to permit a second computer network to penetrate the barrier at the first portion. A container includes a first shell located outside the enclosure and having a fastener configured to penetrate the barrier at the first portion. A second shell is located within the enclosure and has a catch configured to couple to the fastener at the first portion, such that the first shell is fastened to the second shell and the barrier. A firewall device is located within the second shell and configured to monitor network traffic on the first computer network and the second computer network. The second network is prevented from accessing the first one or more networked devices. A motion sensor is mounted on the container and configured to sense a container breach. Responsive to sensing the container breach, the firewall device is deactivated, access of the first network to the second network is disabled, a notification of the container breach is provided, or a state of the motion sensor is recorded in a log.

In some embodiments, the first network and the second network each include cables fastened to the container using tamper-resistant fasteners located within the container. The cables are configured to be unfastened from only within the second shell.

In some embodiments, the network security apparatus further includes a door embedded in the barrier and configured to be secured by a lock. The door permits entry into the enclosure. A security camera is mounted on the barrier and configured to scan at least one of a location outside the enclosure or a location within the enclosure. A motion sensor is mounted on the barrier and configured to sense at least one of motion outside the enclosure or motion inside the enclosure. A door sensor is mounted on the door and configured to sense at least one of motion of the door or a barrier breach.

In some embodiments, the first one or more networked devices include at least one of a computer, a server, or a database storing sensitive data, images, algorithms, software, applications, or processes.

In some embodiments, the enclosure includes a room, and the barrier includes at least one of a floor, a ceiling, or a wall of the room.

In some embodiments, the second shell is configured to prevent a user located within the enclosure from accessing the second computer network.

In some embodiments, the network security apparatus includes a door embedded in the second shell and configured to be secured by a lock, and permit access to the firewall device. A security camera is mounted on the second shell and configured to scan at least one of a location outside the container, or the firewall device. A door sensor is mounted on the door and configured to sense at least one of motion of the door, or a lock breach.

In some embodiments, an apparatus includes a barrier surrounding an enclosure containing a first network. The barrier includes a first portion configured to permit a second computer network to enter the barrier at the first portion. A container includes a first shell located outside the enclosure and having a fastener configured to penetrate the barrier at the first portion. A second shell is located within the enclosure and has a catch configured to couple to the fastener at the first portion, such that the first shell is fastened to the second shell and the barrier, and the first shell prevents access to the fastener. An access control device is located within the second shell and configured to prevent the first network from communicating with second one or more networked devices connected to the second network.

In some embodiments, the catch is further configured to be uncoupled from the fastener from only within the second shell, such that the first shell is unfastened from the second shell and the barrier from only within the second shell.

In some embodiments, the access control device includes at least one of a firewall device, a gateway device, a router, a metering device, or a network monitoring device.

In some embodiments, the second shell is a fire barrier device.

In some embodiments, the apparatus further includes a window embedded in the second shell. The window is configured to permit a user located within the enclosure to observe a visual indicator within the second shell. The visual indicator is generated by at least one of the access control device, a motion sensor mounted on the container and configured to sense a container breach, or a motion sensor mounted on the access control device and configured to sense an access control device breach.

In some embodiments, the first portion of the barrier has an aperture configured to permit the second computer network to penetrate the barrier at the first portion. A slot is configured to permit the fastener to penetrate the barrier at the first portion.

In some embodiments, the second shell has an aperture located on a surface of the second shell. The aperture is configured to permit the first network to enter the second shell.

In some embodiments, a system includes a barrier surrounding an enclosure containing a first network. The barrier is configured to permit a second network to penetrate a first portion of the barrier. An access control device sealed by a container is located within the enclosure. The access control device is configured to mount to the first portion of the barrier, such that a second portion of the container superposes the first portion of the barrier. The access control device controls traffic between the first network and the second network.

In some embodiments, the system further includes a security camera mounted on the barrier and configured to scan at least one of a location outside the enclosure or a location within the enclosure.

In some embodiments, the system further includes a motion sensor mounted on the barrier and configured to sense at least one of motion outside the enclosure or motion inside the enclosure.

In some embodiments, the system further includes a door sensor mounted a the door and configured to sense at least one of motion of the door or a barrier breach.

In some embodiments, the system further includes a security camera mounted on the container and configured to scan at least one of a location outside the container or the firewall device.

In some embodiments, the system further includes a motion sensor mounted on the container and configured to sense at least one of motion outside the container or a container breach.

In some embodiments, the system further includes a door sensor mounted on the door and configured to sense at least one of motion of the door or a door breach.

In some embodiments, the system further includes a window embedded in the container and configured to permit a user located within the enclosure to observe a visual indicator within the container. The visual indicator is generated by at least one of a motion sensor mounted on the container and configured to sense a container breach, or a motion sensor mounted on the access control device and configured to sense an access control device breach.

In some embodiments, the system further includes a motion sensor mounted on the access control device and configured to, responsive to sensing an access control device breach, provide a notification of the access control device breach or record a state of the motion sensor in a log.

In some embodiments, the notification includes a flashing light or a message transmitted over at least one of the first network or the second network.

In some embodiments, the system further includes a conduit located on the surface of the container and configured to permit heat to escape the container via the conduit, or at least one of a heat exchanger, a heat sink, a Peltier device, or a heat tube located within the enclosure and configured to expel the heat from the enclosure.

In some embodiments, the access control device is further configured to prevent a user located within the enclosure from accessing the second computer network.

In some embodiments, the system further includes a tamper-resistant fastener configured to mount the access control device to the first portion of the barrier. Removal of the access control device from the first portion of the barrier is prevented. The access control device is deactivated responsive to detecting an access control device breach.

In some embodiments, the system further includes a motion sensor mounted on the access control device and configured to sense that the access control device has been removed from the first portion of the barrier. Responsive to sensing that the access control device has been removed from the first portion of the barrier, communication between the first network and the second network is disabled. A notification that the access control device has been removed from the first portion of the barrier is sent. A state of the motion sensor is recorded in a log.

In some embodiments, the notification includes at least one of an audible alarm, a flashing light, or a message transmitted over at least one of the first network or the second network.

In some embodiments, the system further includes at least one of a slot located on a surface of the container. The slot permits power cables to enter the container via the slot. A conduit is located on the surface of the container and configured to permit heat to escape the container via the conduit. At least one of a heat exchanger, a heat sink, a Peltier device, or a heat tube is located within the enclosure and configured to expel the heat from the enclosure.

The techniques introduced here can be implemented by programmable circuitry (e.g., one or more microprocessors), software and/or firmware, special-purpose hardwired (i.e., non-programmable) circuitry, or a combination of such forms. Special-purpose circuitry can be in the form of one or more application-specific integrated circuits (ASICs), programmable logic devices (PLDs), field-programmable gate arrays (FPGAs), etc.

The description and drawings herein are illustrative and are not to be construed as limiting. Numerous specific details are described to provide a thorough understanding of the disclosure. However, in certain instances, well-known details are not described in order to avoid obscuring the description. Further, various modifications may be made without deviating from the scope of the embodiments.

The terms used in this specification generally have their ordinary meanings in the art, within the context of the disclosure, and in the specific context where each term is used. Certain terms that are used to describe the disclosure are discussed above, or elsewhere in the specification, to provide additional guidance to the practitioner regarding the description of the disclosure. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that the same thing can be said in more than one way. One will recognize that "memory" is one form of a "storage" and that the terms may on occasion be used interchangeably.

Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any term discussed herein is illustrative only and is not intended to further limit the scope and meaning of the disclosure or of any exemplified term. Likewise, the disclosure is not limited to various embodiments given in this specification.

It is to be understood that the embodiments and variations shown and described herein are merely illustrative of the principles of this invention and that various modifications may be implemented by those skilled in the art.

What is claimed is:

1. A network security system comprising:
   a barrier surrounding an enclosure containing a first computer network and first one or more networked devices configured to be connected to the first computer network, wherein the first computer network is a private computer network, the barrier configured to:
      prevent the first computer network from breaching the enclosure; and
      permit a second computer network to penetrate a first portion of the barrier, wherein the second computer network is a public computer network;
   a container located within the enclosure and configured to:
      mount to the first portion of the barrier, such that a second portion of the container superposes the first portion of the barrier;
      permit the first computer network and the second computer network to enter the container; and prevent the second computer network from breaching the container and entering a third portion of the enclosure located outside the container; and a firewall device located within the container and configured to:
communicate with the first computer network and the second computer network; and
control network traffic between the first one or more networked devices and second one or more networked devices connected to the second computer network.

2. The network security system of claim 1, further comprising a door embedded in the barrier and configured to:
be secured by a lock; and
permit entry into the enclosure.

3. The network security system of claim 1, wherein the first one or (Original) more networked devices comprise at least one of a computer, a server, or a database storing sensitive data, images, algorithms, software, applications, or processes.

4. The network security system of claim 1, wherein the enclosure comprises a room, and the barrier comprises at least one of a floor, a ceiling, or a wall of the room.

5. The network security system of claim 1, wherein the container is configured to prevent a user located within the enclosure from accessing the second computer network.

6. The network security system of claim 1, further comprising:
a door embedded in the container and configured to:
be secured by a lock; and
permit access to the firewall device.

7. The network security system of claim 1, further comprising a tamper-resistant fastener located partly within the container and configured to:
mount the container to the first portion of the barrier; and
be unfastened from only within the container.

8. The network security system of claim 1, wherein the container is a fire barrier device.

9. The network security system of claim 1, further comprising a window embedded in the container and configured to permit a user located within the enclosure to observe a visual indicator within the container, wherein the visual indicator is generated by the firewall device.

10. The network security system of claim 1, further comprising a motion sensor mounted on the container and configured to:
sense a container breach; and
responsive to sensing the container breach:
deactivate the firewall device;
disable access of the first computer network to the second computer network;
provide a notification of the container breach; or
record a state of the motion sensor in a log.

11. The network security system of claim 1, wherein the first portion of the barrier has:
an aperture permitting the second computer network to penetrate the barrier at the first portion; and
a slot permitting a tamper-resistant fastener to penetrate the barrier at the first portion, the tamper-resistant fastener configured to mount the container to the first portion of the barrier.

12. The network security system of claim 1, wherein the container has an aperture located on a surface of the container and configured to permit the first computer network to enter the container.

13. The network security system of claim 1, wherein the first computer network and the second computer network each comprise cables fastened to the container using tamper-resistant fasteners located within the container and configured to be unfastened from only within the container, and
wherein the firewall device is further configured to prevent a user located within the enclosure from accessing the second computer network.

14. The network security system of claim 1, further comprising a tamper-resistant fastener configured to:
mount the firewall device to the first portion of the barrier;
prevent removal of the firewall device from the first portion of the barrier; and
deactivate the firewall device responsive to detecting a firewall device breach.

15. The network security system of claim 1, further comprising a motion sensor mounted on the firewall device and configured to:
responsive to sensing a firewall device breach:
disable communication between the first computer network and the second computer network.

16. The network security system of claim 1, comprising a motion sensor mounted on the container and configured to:
sense a container breach; and
provide a notification of the container breach, wherein the notification comprises an audible alarm.

17. The network security system of claim 1, further comprising:
an aperture located on a surface of the container and configured to permit power cables to enter the container via the aperture.

\* \* \* \* \*